July 23, 1968  R. V. BLACKHURST ETAL  3,393,436
METHOD OF SECURING A BLADE ASSEMBLY IN A CASING, e.g., A GAS
TURBINE ENGINE ROTOR CASING
Filed Sept. 6, 1966
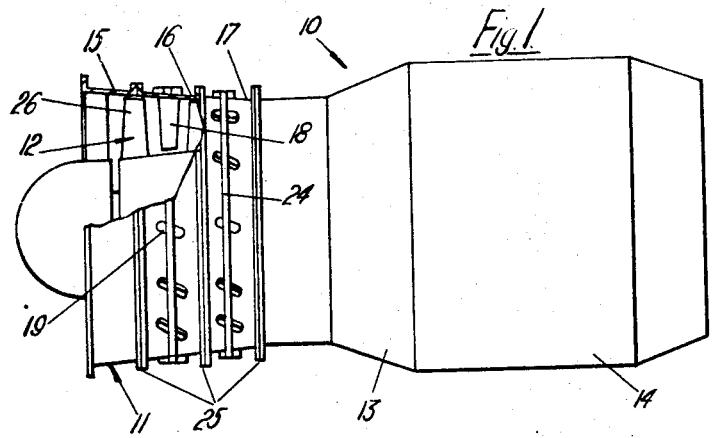
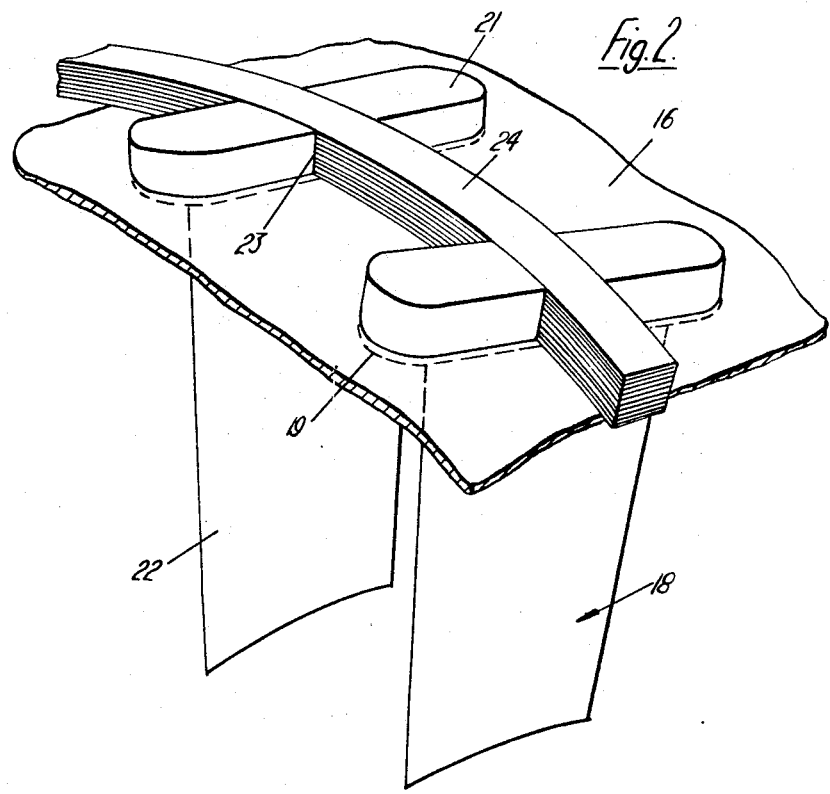

United States Patent Office 3,393,436
Patented July 23, 1968

3,393,436
METHOD OF SECURING A BLADE ASSEMBLY IN A CASING, E.G., A GAS TURBINE ENGINE ROTOR CASING
Robert Vaughan Blackhurst, Ripley, and Peter John Longley, Derby, England, assignors to Rolls-Royce Limited, Derby, England, a British company
Filed Sept. 6, 1966, Ser. No. 577,355
Claims priority, application Great Britain, Sept. 16, 1965, 39,640/65
2 Claims. (Cl. 29—156.8)

ABSTRACT OF THE DISCLOSURE

The invention concerns a method of securing a stator blade ring to a rotor casing of, e.g., a vertical lift jet engine. A single turn of a synthetic resin securing band is first wound round the casing, then a ring of apertures is formed in the casing and the band into which apertures the blades are inserted and secured so that their roots extend radially outwardly of the casing. The roots are then slotted and turns of the securing band are wound in, and secured to, the slots.

---

This invention concerns a method of securing a blade assembly in a casing, e.g., in a gas turbine engine rotor casing.

According to the present invention, there is provided a method of securing of a ring of aerofoil-shaped blades in an annular casing member of a gas turbine engine comprising the steps of winding a single turn of securing band circumferentially around the exterior of said casing member, forming a ring of angularly spaced apart apertures in said casing member and in said band, inserting said ring of blades into the apertures so that at least part of the root portions thereof extend radially outwardly of the casing member, securing said blades in said apertures, cutting a slot in each said root portion so as to form a circumferentially aligned series of slots, winding a plurality of turns of said securing band in and through said slots, and securing said band in position.

Preferably, the cutting of all said slots is performed in a single machining operation.

The invention also comprises a gas turbine engine compressor provided with a ring of stator blades as set forth above. Thus the said compressor may have a casing made up of a plurality of axially consecutive casing members which are secured to each other.

Additionally, the invention comprises a gas turbine engine vertical lift engine having a compressor as set forth above.

The term "vertical lift engine" as used in this specification is intended to indicate an engine adapted to produce vertical lift forces on an aircraft independently of those generated aerodynamically by forward flight of the aircraft. For this purpose the engine may have a thrust to weight ratio of at least 8:1 and preferably of at least 16:1.

The invention is illustrated, merely by way of example, in the accompanying drawings, in which:

FIGURE 1 is a diagrammatic view, partly in section, of a gas turbine engine embodying the present invention, and FIGURE 2 is a broken away perspective view of part of the engine shown in FIGURE 1.

In FIGURE 1 there is shown a gas turbine vertical lift engine 10 which may, for example, have a thrust to weight ratio of at least 16:1 and which has an engine casing 11 (e.g., of titanium) within which there is mounted in flow series, a compressor 12, combustion equipment 13 and turbine 14.

The portion of the casing 11 which forms the casing of the compressor 12 is formed of a plurality (e.g., three, as shown) of axially consecutive casing members 15, 16, 17.

Each of the casing members 16, 17 carries a ring of angularly spaced apart aerofoil-shaped stator blades 18. Each of the blades 18 is formed at least partly of synthetic resin material and may thus be formed of a laminated epoxy resin strengthened with glass fibre. Each of the blades 18 is mounted in an aperture 19 in the respective casing member 16 17 so that the main portions 22 and parts of the root portions 21 of the blades 18 are disposed on opposite sides of the casing members 16, 17. Each root portion 21 has a slot 23 formed therein.

A securing band 24 extends through the slots 23 of each ring of blades 18 and is bonded by means of a synthetic resin (e.g., that marketed under the trade mark "Araldite"), both to all the root portions 21 and to the respective casing members 16, 17. The securing band 24, whose depth is equal to that of the slots 23, is made up of a plurality of turns of a tape or filament formed from a glass reinforced synthetic resin material. The securing band 24 is made strong enough to withstand the radial and shear loads to which it will be subjected.

The casing members 15, 16, 17 are bolted together at flanges 25 and these flanges 25 are radially aligned with rotor blades 26 of the compressor 12.

The casing members 16, 17 with their stator blades 18 may be formed by first winding a single turn of the securing band 24 circumferentially around the exterior of the respective casing member and bonding it thereto. The apertures 19 are now formed, and the stator blades 18 are placed in position and are bonded therein by the use of synthetic resin material, the root portions 21 being initially unslotted. The slots 23 are then cut in the complete ring of stator blades 18 by one machining operation, the cutting tool skimming the surface of the said turn of the securing band 24. The tape or filament of the securing band 24 is then wound in a plurality of turns through the slots 23 so as to fill the full depth of the slots, and is then bonded by the said "Araldite" resin in position.

We claim:
1. A method of securing a ring of aerofoil-shaped blades in an annular casing member of a gas turbine engine comprising the steps of winding a single turn of securing band circumferentially around the exterior of said casing member, forming a ring of angularly spaced apart apertures in said casing member and in said band, inserting said ring of blades into the apertures so that at least part of the root portions thereof extend radially outwardly of the casing member, securing said blades in said apertures, cutting a slot in each root portion so as to form a circumferentially aligned series of slots, winding a plurality of turns of said securing band in and through said slots, and securing said band in position.

2. A method as claimed in claim 1 wherein the cutting of all said slots is performed in a single machine operation.

References Cited

UNITED STATES PATENTS

| 901,459 | 10/1908 | MacDonald. | |
| 2,747,367 | 5/1956 | Savin | 230—122 |
| 3,095,138 | 6/1963 | Warnken. | |
| 3,004,750 | 10/1961 | Broders | 230—133 |

FOREIGN PATENTS

| 267,405 | 3/1927 | Great Britain. |
| 748,912 | 5/1956 | Great Britain. |

HENRY F. RADUAZO, Primary Examiner.